United States Patent
Lin et al.

(10) Patent No.: US 10,126,852 B2
(45) Date of Patent: Nov. 13, 2018

(54) DISPLAY MODULE HAVING DOUBLE-SIDED ILLUMINATION DESIGN

(71) Applicant: AU Optronics Corporation, Hsin-Chu (TW)

(72) Inventors: Chih-Hao Lin, Hsin-Chu (TW); An-Thung Cho, Hsin-Chu (TW); Pin-Miao Liu, Hsin-Chu (TW); Tsung-Tien Wu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 332 days.

(21) Appl. No.: 15/252,304

(22) Filed: Aug. 31, 2016

(65) Prior Publication Data
US 2017/0199604 A1 Jul. 13, 2017

(30) Foreign Application Priority Data

Jan. 12, 2016 (TW) .............................. 105100821 A (51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/133603* (2013.01);
(Continued)

(58) Field of Classification Search
None
See application file for complete search history.

(56) References Cited

U.S. PATENT DOCUMENTS 7,193,666 B2 3/2007 Choi et al.
7,380,953 B2 6/2008 Onishi et al.
(Continued)

FOREIGN PATENT DOCUMENTS

TW I255946 B 6/2006
TW I276880 B 3/2007
(Continued)

OTHER PUBLICATIONS

TW Office Action dated Feb. 10, 2017 in corresponding Taiwan application (No. 105100821).

*Primary Examiner* — Nicholas Lee
(74) *Attorney, Agent, or Firm* — McClure, Qualey & Rodack, LLP (57) ABSTRACT

A display device of the present invention includes a light source layer and a sensing unit layer. The light source layer has a display side and a sensing side at the backside of the display side. The light source layer includes a plurality of first light sources generating a first light, and a plurality of second light sources generating a second light. The first light at least partially emits toward the sensing side; the second light at least partially emits toward the display side. A second wavelength of the second light is different from a first wavelength of the first light. The sensing unit layer is disposed at the sensing side of the light source layer. In a sensing mode, the plurality of the first light sources is activated to generate and provide the first light for the sensing unit layer. In a displaying mode, the plurality of the second light sources is activated to generate the second light for displaying an image at the display side.

14 Claims, 10 Drawing Sheets

(51) Int. Cl.
*G09G 3/34* (2006.01)
*G09G 3/36* (2006.01)
*G02F 1/1335* (2006.01)
*G06F 3/042* (2006.01)

(52) U.S. Cl.
CPC .......... *G06F 3/042* (2013.01); *G06F 3/0416* (2013.01); *G09G 3/342* (2013.01); *G09G 3/3406* (2013.01); *G09G 3/36* (2013.01); *G09G 2354/00* (2013.01)

(56) References Cited

U.S. PATENT DOCUMENTS

| | | | |
|---|---|---|---|
| 8,098,349 B2 | 1/2012 | Hung et al. | |
| 9,019,242 B2 | 4/2015 | Chang et al. | |
| 2012/0019434 A1* | 1/2012 | Kuhlman | G02F 1/13306 345/1.3 |
| 2016/0058375 A1* | 3/2016 | Rothkopf | G06F 1/1643 600/301 |
| 2016/0076738 A1 | 3/2016 | Hsueh et al. | |
| 2016/0085286 A1* | 3/2016 | Zhou | G06F 1/1637 345/156 |
| 2016/0349790 A1* | 12/2016 | Connor | G06F 1/1694 |

FOREIGN PATENT DOCUMENTS

| | | |
|---|---|---|
| TW | I283316 B | 7/2007 |
| TW | M341857 U | 10/2008 |
| TW | 201517322 A | 5/2015 |
| TW | 507737 U | 9/2015 |

\* cited by examiner

DISPLAY MODULE HAVING DOUBLE-SIDED ILLUMINATION DESIGN

BACKGROUND

The present application claims priority to Taiwan patent application number 105100821, filed Jan. 12, 2016, the contents are incorporated herein by reference.

Technical Field

The present invention relates to a display module, and in particular, to a display module having both displaying and sending designs.

Related Art

As display and sensing technologies develop, increasingly more display apparatuses combine a sensing function with a displaying function. In applications in which the sensing technologies are available, a touch function is a widely used function. Currently, some products reserve original physical keys for certain touch functions.

Most current display apparatuses having both a sensing function and a displaying function, use capacitive or resistive recognition elements to implement the sensing function. However, the display apparatuses generally need to use independent system resources so that the capacitive (or resistive) recognition elements can operate smoothly. Therefore, the physical size (e.g., cubic volume) of the display apparatus is increased. It is desired, however, to provide these functions, while realizing a display apparatus having a smaller size.

SUMMARY

An objective of the present invention is to provide a display module, which can reduce the size requirements of the display module while having a sensing function.

A display module of one embodiment includes a light source layer and a sensing unit layer. The light source layer has a display side and a sensing side at the backside of the display side. The light source layer includes a plurality of first light sources generating a first light having a first wavelength, and a plurality of second light source generating a second light having a second wavelength. The first light at least partially emits toward the sensing side directly or indirectly; the second light at least partially emits toward the display side directly or indirectly, and the second wavelength is different from the first wavelength. The sensing unit layer is disposed at the sensing side of the light source layer. In a sensing mode, the first light sources are activated to generate and provide the first light for the sensing unit layer to use; and in a displaying mode, the second light sources are activated to generate the second light for displaying an image at the display side.

A display module light source driving method includes the following steps: dividing an image into multiple regions and calculating brightness of each region, so as to generate a calculation result; activating first light sources to generate a first light, and adjusting, according to the calculation result, light intensity of the light emitted by the first light sources toward a sensing side; and activating second light sources to generate a second light, and adjusting, according to the calculation result, light intensity of the light emitted by the second light sources toward a liquid crystal layer.

DETAILED DESCRIPTION

Embodiments of the present invention are directed to a display module, whose first light sources and second light sources may be activated in different times, and emit light respectively toward a sensing side and a display side. The display module of embodiments of the present invention may preferably be applied to a self-luminous display apparatus, for example, but not limited to, a micro light emitting diode display. The display module may also be applied to a non-self-luminous display apparatus, for example, a liquid crystal display.

Figure 1A:
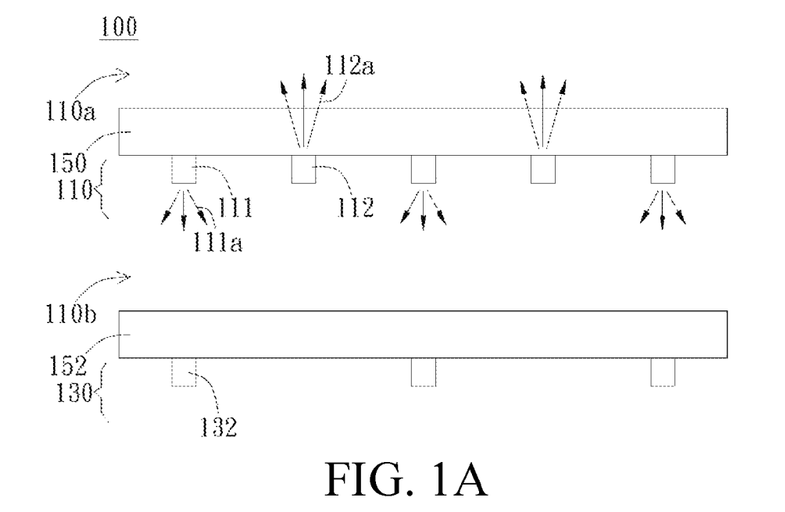
FIG. 1A is a side view of an embodiment of a display module according to embodiments of the present invention.

FIG. 1A is a side view of an embodiment of a display module 100 according to the present invention. As shown in FIG. 1A, the display module 100 includes a light source layer 110 and a sensing unit layer 130. The light source layer 110 has a display side 110a and a sensing side 110b at the backside of the display side 110a, and the sensing unit layer 130 is disposed at the sensing side 110b of the light source layer 110. The light source layer 110 includes a plurality of first light sources 111 generating a first light 111a, and a plurality of second light sources 112 generating a second light 112a. As shown in FIG. 1A, the display module 100 includes a first substrate 150 and a second substrate 152. The first light sources 111 and the second light sources 112 are disposed on first substrate 150. The sensing unit layer 130 includes a plurality of sensing units 132 disposed on the second substrate 152. The sensing units 132 are, for example, light source receivers.

Figure 1B:
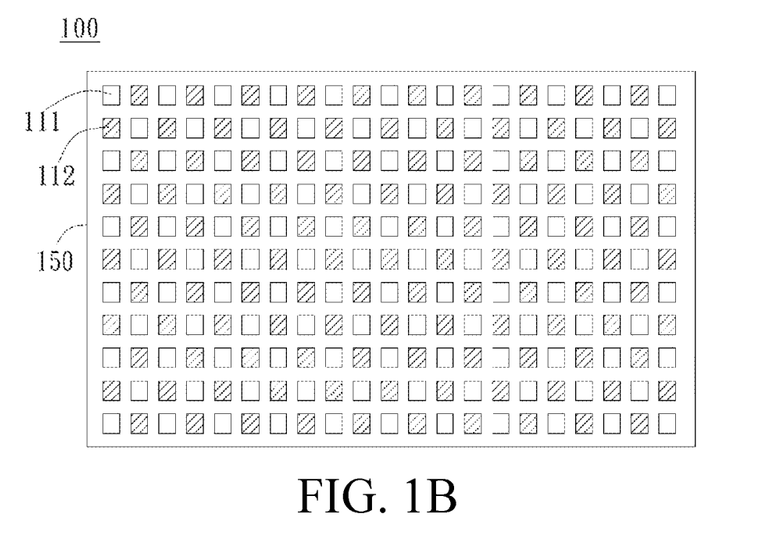
FIG. 1B is a schematic diagram of an embodiment of distributed deposition of first light sources and second light sources.

Referring to FIG. 1B, a schematic diagram of distributed disposition of light sources is shown. As shown in FIG. 1B, the first light sources 111 and the second light sources 112 are distributed on the first substrate in a pixel array manner. In an embodiment, the first light sources 111 and the second light sources 112 are preferably micro light emitting diodes, and are preferably the size of pixels. The first light sources 111 and the second light sources 112 preferably have relatively high brightness, and each light source can be driven separately to emit light. The display module adopting the micro light emitting diodes is self-luminous, thereby further reducing the thickness of the overall structure.

As for the light emitting manner, the first light sources 111 and the second light sources 112 may use single-sided illumination light sources. As shown in FIG. 1A, the first light 111a may emit directly toward the sensing side 110b, and the second light 112a may emit directly toward the display side 110a. The second wavelength of the second light 112a is different from the first wavelength of the first light 111a. For example, micro light emitting diodes having infrared light are used as the first light sources, and micro light emitting diodes having red/green/blue light are used as the second light sources. Moreover, the display module 100 may be used in a sensing mode and a displaying mode. In the sensing mode, the first light sources 111 are activated to generate and provide the first light 111a for the sensing unit layer 130 to use. For example, after the first light 111a irradiates a to-be-measured object, a part of the first light 111a is reflected to be received by the plurality of sensing units 132 of the sensing unit layer. Therefore, the sensing units 132 may be distributed as an array respectively corresponding to the first light sources 111, so as to receive a change of the first light 111a (for example, a change of the light intensity). In the displaying mode, the second light sources 112 are activated to generate the second light 112a for displaying an image at the display side 110a. By means of this design, the display module 100 can have both the displaying function and the sensing measurement function.

Figure 2:
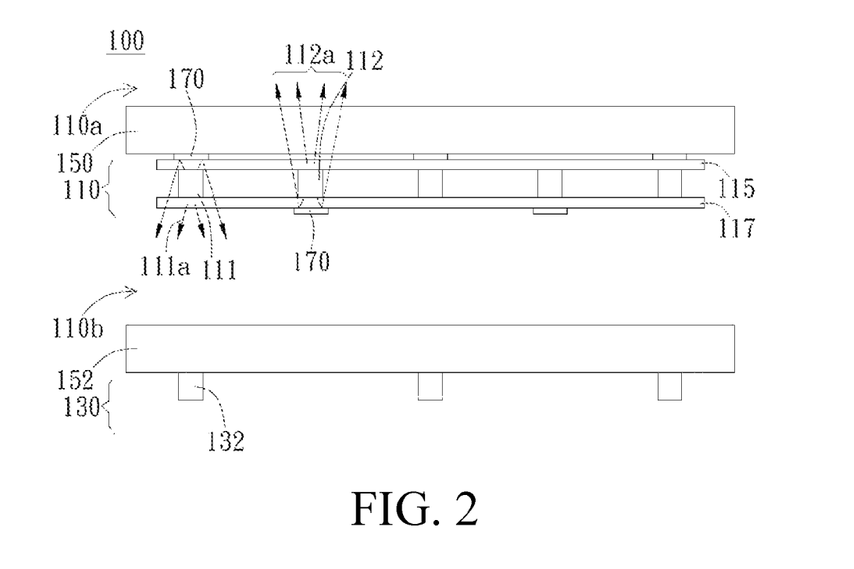
FIG. 2 is a side view of an embodiment of a display module having different light emitting manners.

FIG. 2 is a side view of an embodiment of a display module 100 having different light emitting manners. Different from the above-described embodiment, in addition to the first light sources 111 and the second light sources 112, the light source layer 110 further includes a first electrode layer 115, a second electrode layer 117 and a plurality of reflector units 170. As shown in FIG. 2, the first electrode layer 115 is disposed at a display side 110a of the first light sources 111 and the second light sources 112, and is respectively electrically connected to the first light sources 111 and the second light sources 112. The second electrode layer 117 is disposed at a sensing side 110b of the first light sources 111 and the second light sources 112, and is respectively electrically connected to the first light sources 111 and the second light sources 112. The reflector units 170 are disposed at the display side 110a of the first light sources 111 or at the sensing side 110b of the second light sources 112. Specifically, the reflector units 170 are disposed at an outer side of the first electrode layer 115 corresponding to the first light sources 111, or are disposed at an outer side of the second electrode layer 117 corresponding to the second light sources 112, so as to guide the light emitting toward the sensing side 110b/display side 110a to an opposite side.

In the embodiment of FIG. 2, the first light sources 111 and the second light sources 112 may adopt dual-sided illumination or overall illumination light sources, that is, the light sources may emit light both toward the sensing side 110b and the display side 110a, so that the first light 111a at least partially emits toward the sensing side 110b directly or indirectly, or the second light 112a at least partially emits toward the display side 110a directly or indirectly. As shown in FIG. 2, a part of the first light 111a emits directly toward the sensing side 110b, and the other part of the first light 111a emits toward the display side 110a and then emits to the sensing side 110b after being reflected by the reflector units 170. In other words, the reflector unit 170 disposed in the display side 110a may reflect the first light 111a, so that the first light 111a emits from the sensing side 110b. Similarly, a part of the second light 112a emits directly toward the display side 110a, and the other part of the second light 112a emits toward the sensing side 110b and then emits to the display side 110a after being reflected by the reflector units 170. In other words, the reflector unit 170 disposed in the sensing side 110b may reflect the second light 112a, so that the second light 112a emits from the display side 110a. Therefore, the display module 100 may use the reflector units 170 to adjust distribution of light, thereby achieving the effect of uniform light emission, and improving the utilization of light.

Figure 3:
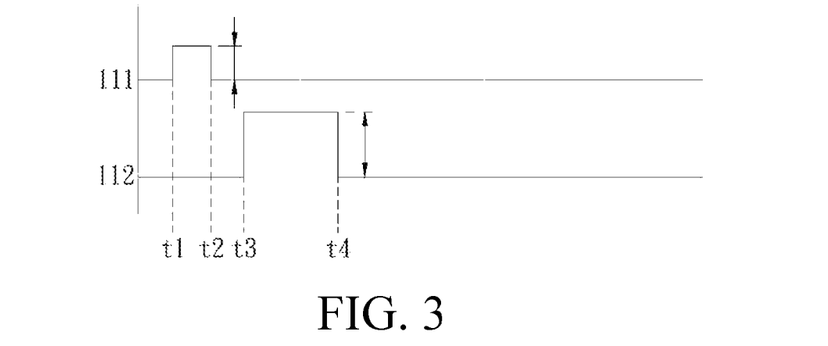
FIG. 3 is a timing diagram of an embodiment of a display module starting a sensing mode and a displaying mode.

FIG. 3 is a timing diagram of an embodiment of a display module starting a sensing mode and a displaying mode. As shown in the above, the display module may be used in the sensing mode and the displaying mode, and control light sources to be activated in different modes. Further, the sensing mode and the displaying mode may adopt different start timings according to requirements. As shown in FIG. 3, in the sensing mode (times t1-t2), the first light sources 111 are activated. The displaying mode starts when the sensing mode ends (that is, starts from a time t3), and in the displaying mode, the second light sources 112 are activated. In one implementation, the timing control may be used in, for example, vein recognition, in which micro light emitting diodes having infrared light are used as first light sources, a first light is emitted in the sensing mode to shoot vine lines, and a sensing unit receives and analyzes an absorption change of the infrared light. Then, micro light emitting diodes having red/green/blue light are used as second light sources, and a second light is emitted in the displaying mode to display a shooting result.

In the above implementation manner, the first light sources select infrared light whose wavelength is greater than that of the visible light, but the present invention is not limited thereto, and the first light sources may change the selected light source type according to a type and a surface characteristic of an object to be measured, or may select light sources with the wavelength being less than that of the visible light. Moreover, the intensity of the first light is preferably less than the intensity of the second light, the second light having the large intensity may provide sufficient displaying brightness to the display side in different environments indoor or outdoor. The first light does not have this requirement, and has smaller intensity, thereby achieving power saving. In other embodiments, an environmental light detection module may be set in the display module, so as to adjust the intensity of the second light sources according to a using environment, thereby saving power.

Figure 4A:
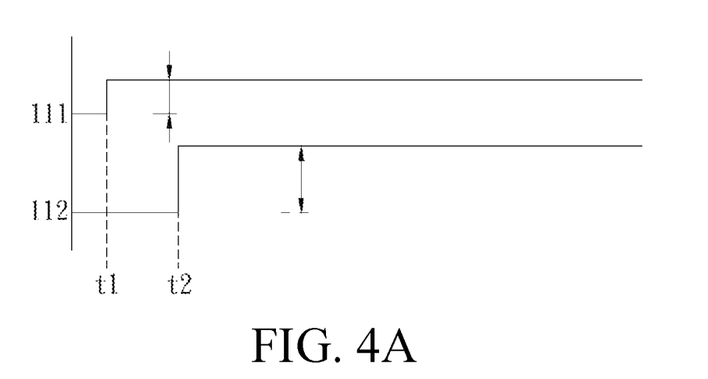
FIG. 4A is a timing diagram of another embodiment of a display module starting a sensing mode and a displaying mode.

FIG. 4A is a timing diagram of another embodiment of a display module starting a sensing mode and a displaying mode. As shown in FIG. 4A, in the sensing mode (that is, starting from a time t1), the first light sources 111 are activated, and the first light sources 111 are activated continuously. The displaying mode starts after the sensing mode starts for a time interval (that is, starting from a time t2). As shown in FIG. 4A, in the displaying mode, the second light sources 112 are activated, and the second light sources 112 are activated continuously, thereby providing a state in which the displaying mode and the sensing mode coexist. In one application, the timing control may be used for pulse measurement.

Figure 4B:
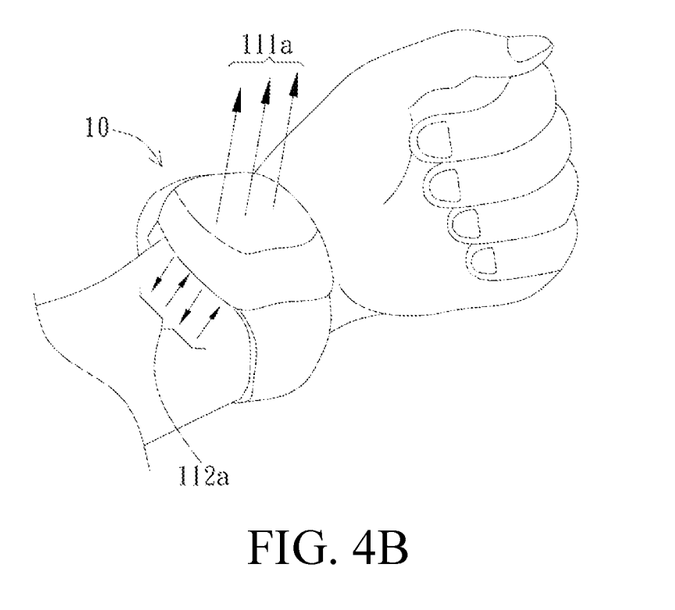
FIG. 4B is a schematic diagram of a measurement manner applying a display module of an embodiment of the present invention.

Reference is made to FIG. 4B. As shown in FIG. 4B, a display apparatus 10 using the display module of the present invention uses micro light emitting diodes of infrared light as first light sources, and in a sensing mode, a first light 111a is emitted to continuously measure the pulse rate, and a sensing unit receives a measurement value. Then, micro light emitting diodes of red/green/blue light are used as second light sources, and in a displaying mode, a second light 112a is emitted and the measurement result is displayed, and at the same time, the pulse rate is measured continuously.

Figure 5A:
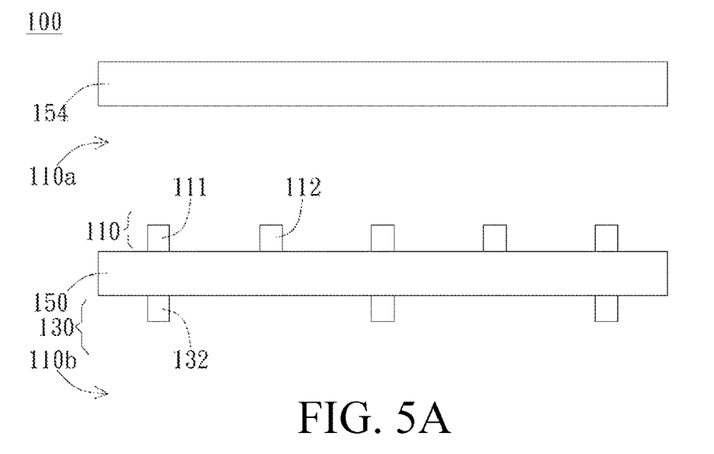
FIG. 5A is a side view of different embodiments of a light source layer and a sensing layer being located at opposite sides of a first substrate.

The display module may select different structures according to process requirements. Reference is now made to FIG. 5A and FIG. 6A. FIG. 5A and FIG. 6A are side views of different embodiments of a display module 100 disposing a light source layer 110. As shown in FIG. 5A, the display module 100 includes a light source layer 110 and a sensing unit layer 130. The light source layer 110 and the sensing unit layer 130 are respectively disposed at opposite sides of the first substrate 150. After the light source layer 110 and the sensing unit layer 130 are completed, a covering substrate 154 is disposed at the display side 110a. For a specific structure of the sensing unit, reference is made to FIG. 5B in which a sectional structural diagram of the first substrate 150 disposing first light sources 111 and sensing units 132 is shown.

Figure 5B:
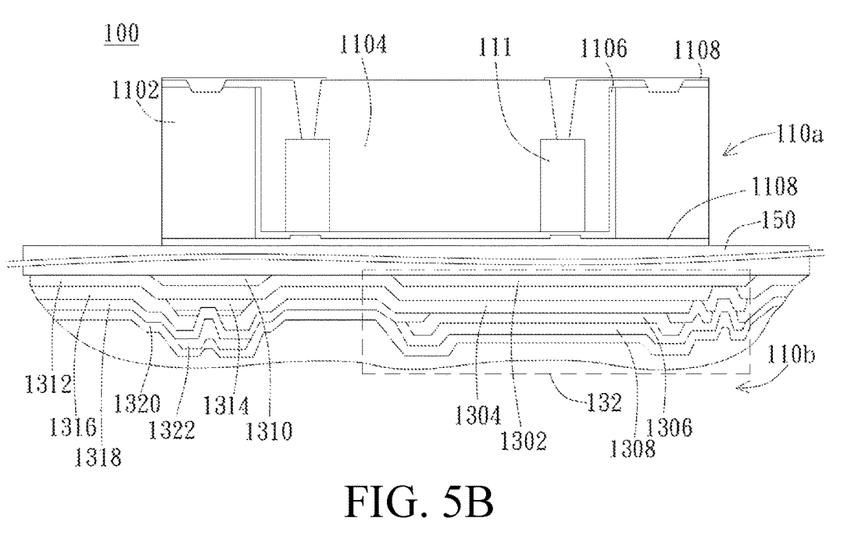
FIG. 5B is a sectional structural diagram of a first substrate disposing a sensing unit.
Figure 6A:
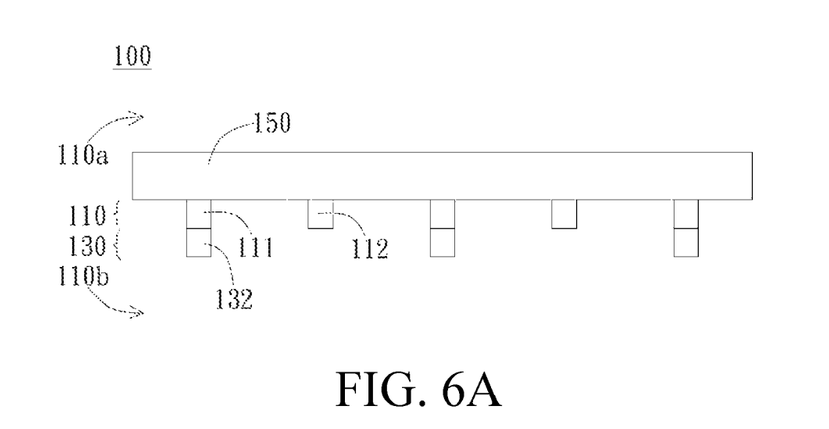
FIG. 6A is a side view of an embodiment of a light source layer and a sensing layer being located at the same side of a first substrate.

As shown in FIG. 5B, the first light sources 111 are disposed at a display side 110a of the first substrate 150, and the sensing units 132 are formed by deposition at a sensing side 110b on the opposite side. As further shown in FIG. 5B, a part of a photoresist layer 1102 is removed, and the first light sources 111 are disposed at predetermined positions. Upper and lower ends of the first light source 111 are respectively connected to a signal line 1108 and extend toward two sides to be connected to a control structure (not shown) outside a panel. A metal reflective layer 1106 may be disposed at one side of the first light sources 111 near the first substrate 150 to a side of the photoresist layer 1102 as required, so as to adjust the light emitting efficiency, other parts of the position where the first light sources 111 are disposed are filled with an insulation layer 1104. At the sensing side 110b, a capacitor electrode 1302, a source 1304, a first passivation layer 1318, an optical sensing layer 1306, a transparent common electrode 1308, and a second passivation layer 1320 are disposed on the first substrate 150 to form the sensing unit 132. The sensing unit 132 and the first light source 111 at opposite sides may receive signals from different control structures, and therefore, a switch-on manner of the light source may be the same as that when a separate backlight module is used. For example, signals at both sides of the substrate are connected, through a flexible circuit board, to a circuit board outside the substrate, and are received by respective driver ICs. At a position adjacent to the sensing unit 132, a gate 1310, a gate insulation layer 1312, an amorphous silicon layer 1314, a drain 1316, a first passivation layer 1318, a light filtering layer 1322, and a second passivation layer 1320 are deposited to form a thin-film transistor to drive the sensing unit. Therefore, the light source layer and the sensing unit layer may be implemented on the same substrate, so as to reduce the overall thickness, and thereby reduce the cubic volume of the apparatus.

Figure 6B:
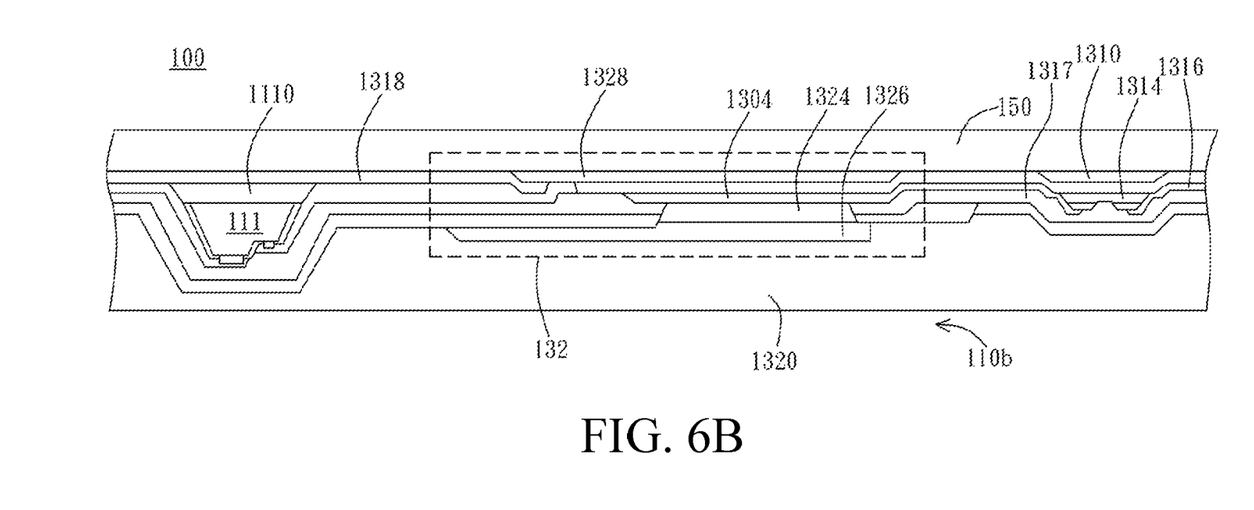
FIG. 6B is a sectional structural diagram of a display module.

In addition, please refer to the display module in FIG. 6A, as shown in FIG. 6A, the light source layer 110 and the sensing unit layer 130 of the display module 100 are disposed at the same side of the first substrate 150. In other words, the light source layer 110 is disposed on the first substrate 150, and the sensing unit layer 130 is disposed on a side of the light source layer 110 opposite to the first substrate 150. Reference is made to FIG. 6B for the specific structure of the display module. As shown by a local structural cross section in FIG. 6B, the first light sources 111 and the sensing units 132 are formed by deposition at the sensing side 110b of the first substrate 150. A conductive layer 1328, a first passivation layer 1318, a source 1304, a flat layer 1317, an optical sensing layer 1324, a transparent electrode 1326, and a second passivation layer 1320 are deposited on the first substrate 150 to form the sensing unit 132. The first light sources 111 are disposed on the first passivation layer 1318 by an adhesion layer 1110, and one side away from the first substrate 150 is covered by the disposition of the source 1304, the flat layer 1317 and the second passivation layer 1320. At a position adjacent to the sensing unit 132, a gate 1310, a first passivation layer 1318, an amorphous silicon layer 1314, a drain 1316, a flat layer 1317, and a second passivation layer 1320 are deposited to form a thin-film transistor to drive the sensing unit. By means of this design, the first substrate 150 may be provided to dispose the light source layer 110 and the sensing unit layer 130, and further has covering and protection effects, thereby further reducing the volume of the display module 100.

Figure 7A:
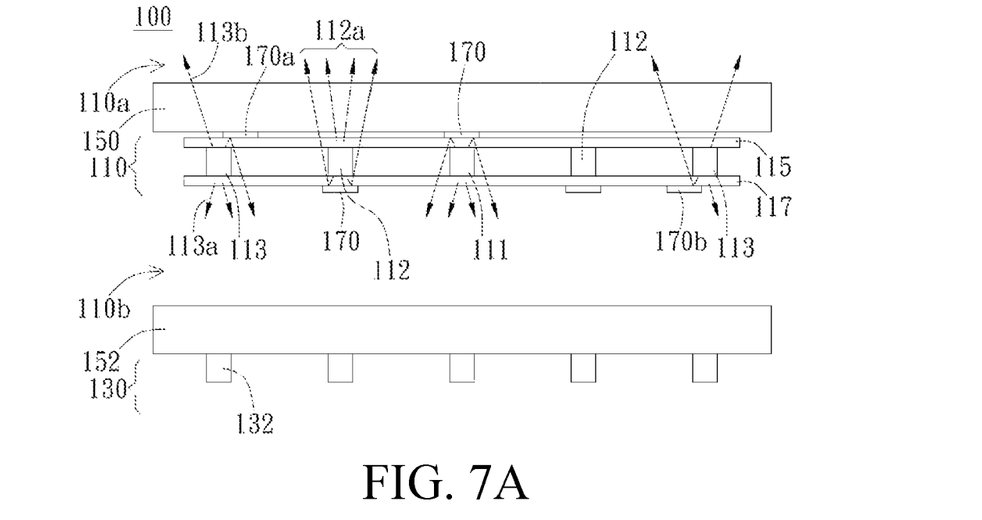
FIG. 7A is a schematic diagram of an embodiment of a display module having a third light source.

In addition, the display module may adjust light emission of the light sources according to actual applications, so as to be changed to different structures. FIG. 7A is a schematic diagram of an embodiment of a display module 100 having third light sources 113. As shown in FIG. 7A, the display module 100 includes a light source layer 110 and a sensing unit layer 130. The light source layer 110 includes first light sources 111, second light sources 112 and the third light source 113 disposed on a first substrate 150. The sensing unit layer 130 includes a plurality of sensing units 132 disposed on a second substrate 152. The first electrode layer 115 is disposed at a display side 110a of the first light sources 111, the second light sources 112 and the third light sources 113, and is respectively electrically connected to the first light sources 111, the second light sources 112 and the third light sources 113. The second electrode layer 117 is disposed at a sensing side 110b of the first light sources 111-third light sources 113, and is respectively electrically connected to the first light sources 111-third light sources 113. A reflector unit 170 is disposed at the display side 110a or sensing side 110b of the light source layer 110.

In the embodiment of FIG. 7A, the first light sources 111, the second light sources 112 and the third light sources 113 may adopt dual-sided illumination light sources. The third light sources 113 generate a third light 113a having a third wavelength, the third wavelength being different from the first wavelength or the second wavelength. The reflector unit 170 disposed at the display side 110a may reflect the first light 111a, so that the first light 111a emits from the sensing side 110b. The reflector unit 170 disposed at the sensing side 110b may reflect the second light 112a, so that the second light 112a emits from the display side 110a. Moreover, the reflector units (170a, 170b) are disposed at an outer side of the first electrode layer 115 corresponding to the third light sources 113. The reflector unit 170 corresponding to the first light sources 111 shields, from a projection direction of the first substrate 150, a light emitting path of the first light sources 111 toward the display side 110a; differently, the reflector unit 170a corresponding to the third light sources 113 exposes, from the display side 110a, a part of a light emitting path of the third light sources 113 toward the display side 110a, so that a part of the third light emits directly or indirectly toward the display side 110a and emits directly or indirectly toward the sensing side 110b, that is, the third light sources 113 may emit the third light toward two sides (the display side 110a and the sensing side 110b).

Specifically, as shown in FIG. 7A, a part of the third light 113a directly emits toward the sensing side 110b, a part of the third light 113b directly emits toward the display side 110a, and a part of the third light 113b emitting toward the display side 110a emits toward the display side 110a and then emits to the sensing side 110b after being reflected by the reflector unit 170a. Therefore, the third light may be partially provided to be used by the sensing unit layer, and partially provide to the display side for image displaying. Moreover, the reflector unit 170b may also be disposed at an outer side of the second electrode layer 117 corresponding to the third light sources 113, and the sensing side 110b exposes a part of a light emitting path of the third light sources 113 toward the sensing side 110b, so as to achieve the effect of the third light being partially provided to the sensing side and partially provided to the display side.

Figure 7B:
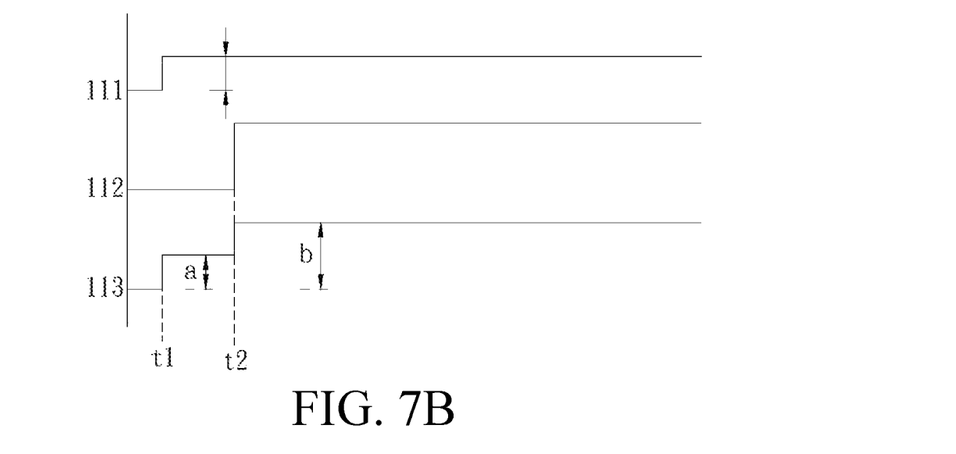
FIG. 7B is a timing diagram of another embodiment of a display module starting a sensing mode and a displaying mode.

FIG. 7B is a timing diagram of another embodiment of a display module starting a sensing mode and a displaying mode. As shown in FIG. 7B, the display module may be used in a sensing mode and a displaying mode. In the sensing mode, first light sources 111 and third light sources 113 (that is, starting from a time t1) are activated, and the first light sources 111 and the third light sources 113 are activated continuously. The first light sources 111 generate and provide a first light for a sensing unit layer to use, and the third light sources 113 generate a third light having a first intensity a for the sensing unit layer to use. In the displaying mode, second light sources 112 (that is, starting from a time t2) are activated, and the intensity of the third light sources is adjusted. The second light sources 112 generate a second light for displaying an image at a display side, and the third light sources 113 generate a third light having a second intensity b for displaying an image at the display side. In an actual application, the timing control is preferably used for blood oxygen monitoring, for example, micro light emitting diodes having infrared light are used as the first light sources, micro light emitting diodes having green/blue light are used as the second light sources, and micro light emitting diodes having red light are used as the third light sources.

In the sensing mode, the first light sources and the third light sources respectively emit the first light and the third light to monitor the blood oxygen concentration, and sensing units receive and compare measurement values. Therefore, the sensing units may be distributed in an array respectively corresponding to positions of the first light sources and the third light sources, so as to receive changes of the first light and the third light (for example, changes of light intensity), or may be distributed in an array respectively corresponding to positions of the first light sources, the second light sources and the third light sources, so as to increase the range of receiving the first light and the third light. Then, in the displaying mode, the second light sources emit the second light, and display the measurement result together with a part of the third light emitting toward the display side.

It should be noted that, in the above implementation manner, the first intensity of the third light is less than the second intensity, where the first intensity may be substantially equal to the intensity of the first light, and the second intensity may be substantially equal to the intensity of the second light, so as to provide a preferable display effect together with the intensity of the second light, and provide sufficient display brightness for the display side in different environments indoor and outdoor. In other embodiments, the second intensity may also be changed along with the intensity of the second light source, and therefore, the third light is not limited to the case in which the first intensity is less than the third intensity.

Figure 8A:
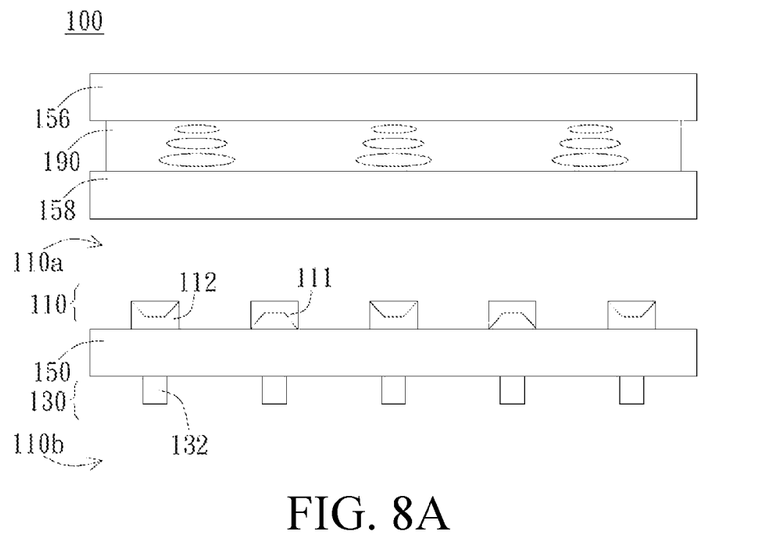
FIG. 8A is a side view of an embodiment of adopting a display module having a liquid crystal layer.

FIG. 8A is a side view of an embodiment adopting a display module having a liquid crystal layer 190. As shown in FIG. 8A, the display module 100 includes a liquid crystal layer 190, a light source layer 110 and a sensing unit layer 130. The light source layer 110 has a display side 110a and a sensing side 110b at the backside of the display side 110a. First light sources 111 and second light sources 112 are disposed on a first substrate 150. Sensing units 132 are disposed on the sensing side 110b of the light source layer, and are located on one surface of the first substrate 150 opposite to the first light sources 111 and the second light sources 112. The liquid crystal layer 190 is located on the display side 110a of the light source layer 110, and is sandwiched between a color filter substrate 156 and a display driver substrate 158.

Figure 8B:
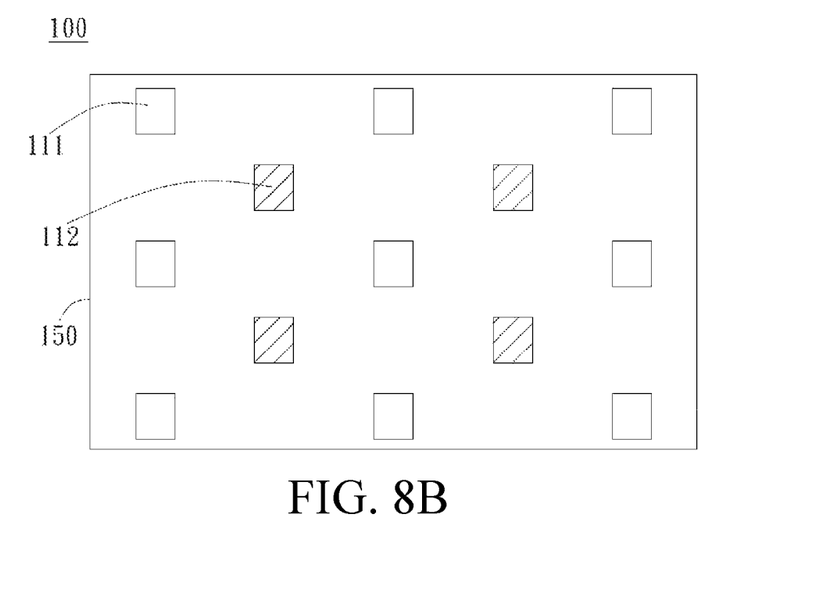
FIG. 8B and FIG. 8C are schematic diagrams of different embodiments of distributed disposition of first light sources and second light sources.
Figure 8C:
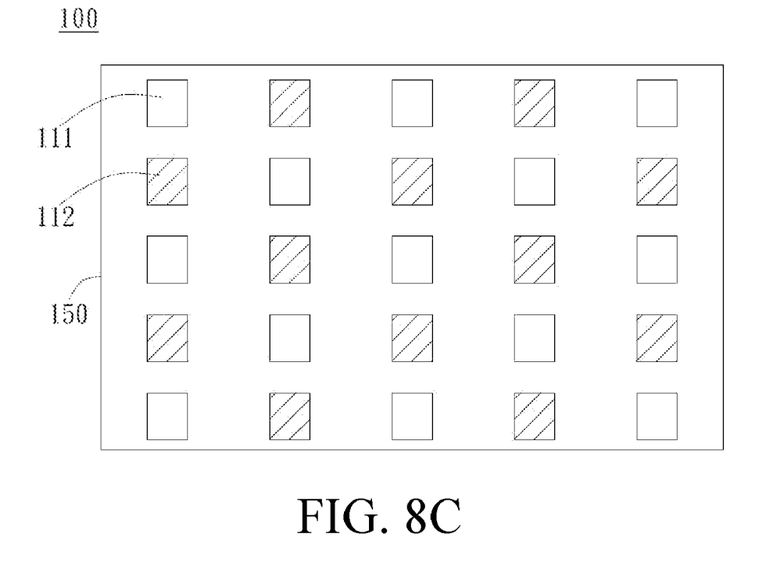

In the embodiment of FIG. 8A, the first light sources 111 and the second light sources 112 may use light emitting diodes as backlight sources. The first light sources 111 and the second light sources 112 are of single-sided illumination and have different wavelengths. As shown in FIG. 8A, the first light 111 may directly emit toward the sensing side 110b, and the second light 112 may directly emit toward the display side 110a. Moreover, as shown in FIG. 8B, the first light sources 111 and the second light sources 112 are distributed on the first substrate 150 in an array, and the first light sources 111 and the second light sources 112 are activated respectively in a regional dimming manner. For example, the display module may divide a display image or a measurement image range into multiple regions and calculate brightness of each region, and adjust, according to a calculation result, intensities of the first light sources and the second light sources. Therefore, the effect of the micro light emitting diode emitting light with a single drive in the sensing/displaying mode may be achieved. In addition, as shown in FIG. 8C, the first light sources 111 and the second light sources 112 may change distribution density according to the size of a display image and a measurement range, so as to improve the display effect, and improve the accuracy of sensing measurement.

Figure 9:
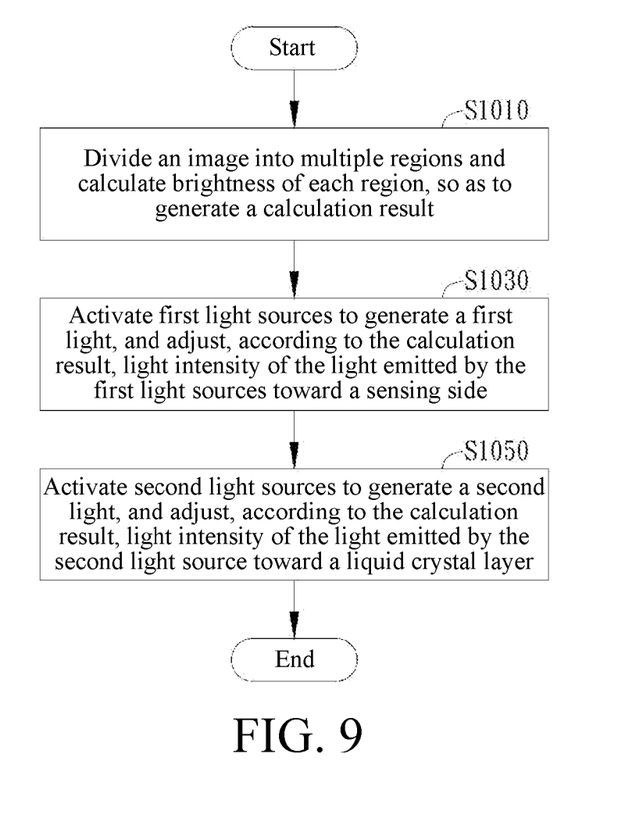
FIG. 9 is a flow chart of an embodiment of a display module light source driving method.

FIG. 9 is a flow chart of an embodiment of a display module light source driving method. As shown in FIG. 9, the display module light source driving method adopting the display module having the liquid crystal layer includes the following steps: in step S1010, dividing an image into multiple regions and calculating brightness of each region, so as to generate a calculation result; in step S1030, activating first light sources to generate a first light, and adjusting, according to the calculation result, light intensity of the light emitted by the first light sources toward a sensing side; and in step S1050, activating second light sources to generate a second light, and adjusting, according to the calculation result, light intensity of the light emitted by the second light source toward a liquid crystal layer.

The present invention has been described through the related embodiments; however, the above embodiments are merely examples of implementing the present invention. It should be noted that, the disclosed embodiments are not intended to limit the scope of the present invention. In contrast, modifications and equivalent configurations without departing from the spirit and scope of the claims shall all fall within the scope of the present invention.

What is claimed is:

1. A display module, comprising:
   a light source layer, having a display side and a sensing side at a backside of the display side, wherein the light source layer comprises:
   a plurality of first light sources, generating a first light having a first wavelength, and the first light at least partially emitting in a direction toward the sensing side; and
   a plurality of second light sources, generating a second light having a second wavelength, and the second light at least partially emitting in a direction toward the display side, wherein, the second wavelength is different from the first wavelength; and
   a sensing unit layer, disposed at the sensing side of the light source layer,
   wherein, when in a sensing mode, the first light sources are activated to generate and provide the first light for the sensing unit layer to use, and when in a displaying mode, the second light sources are activated to generate the second light for displaying an image at the display side.

2. The display module according to claim 1, further comprising a first substrate, wherein the first light sources and the second light sources are distributed on the first substrate in a manner of a pixel array.

3. The display module according to claim 2, wherein the light source layer comprises a plurality of reflector units, disposed at the display side of the first light sources, so as to reflect at least partial of the first light to emit from the sensing side; or disposed at the sensing side of the second light sources, so as to reflect at least partial of the second light to emit from the display side.

4. The display module according to claim 3, wherein the light source layer comprises:
   a first electrode layer, disposed at the display side of the first light sources and the second light sources, and respectively electrically connected to the first light sources and the second light sources; and
   a second electrode layer, disposed at the sensing side of the first light sources and the second light sources, and respectively electrically connected to the first light sources and the second light sources;
   wherein, the reflector units are disposed at an outer side of the first electrode layer corresponding to the first light sources or disposed at an outer side of the second electrode layer corresponding to the second light sources.

5. The display module according to claim 2, wherein the displaying mode starts after the sensing mode ends.

6. The display module according to claim 2, wherein the displaying mode starts after the sensing mode starts for a time interval, and coexists with the sensing mode.

7. The display module according to claim 2, wherein the intensity of the first light is less than the intensity of the second light.

8. The display module according to claim 2, wherein the first wavelength is greater than the second wavelength.

9. The display module according to claim 2, wherein the sensing unit layer comprises a plurality of sensing units, and the sensing units respectively correspond to the first light sources and are distributed in an array.

10. The display module according to claim 2, wherein the light source layer and the sensing unit layer are respectively disposed at opposite sides of the first substrate.

11. The display module according to claim 2, wherein the light source layer is disposed on the first substrate, the sensing unit layer is disposed at one side of the light source layer opposite to the first substrate.

12. The display module according to claim 1, wherein the light source layer comprises third light sources, the third light sources generate a third light having a third wavelength, and the third wavelength is different from the first wavelength or the second wavelength; the third light partially emits in a direction toward the display side directly or indirectly, and partially emits in a direction toward the sensing side directly or indirectly; in the sensing mode, the third light sources are activated to generate and provide the third light having a first intensity for the sensing unit layer to use; and in the displaying mode, the third light sources are activated to generate the third light having a second intensity for displaying an image at the display side.

13. The display module according to claim 12, wherein the first intensity is less than the second intensity.

14. A display module light source driving method, wherein the display module comprises a light source layer having a display side and a sensing side opposite to each other, a sensing unit layer disposed at the sensing side, and a liquid crystal layer disposed at the display side, the sensing side is located at a backside of the display side, and the light source layer comprises a plurality of first light sources and a plurality of second light sources, the display module light source driving method comprising the following steps:
   dividing an image into multiple regions and calculating brightness of each region, so as to generate a calculation result;
   activating the first light sources to generate a first light, and adjusting, according to the calculation result, the light intensity of the light emitted by the first light sources in a direction toward the sensing side; and
   activating the second light sources to generate a second light, and adjusting, according to the calculation result, the light intensity of the light emitted by the second light source in a direction toward the liquid crystal layer.

* * * * *